(No Model.)
E. F. OSBORNE.
OUTLET FOR TANKS OF STEAM HEATING APPARATUS.
No. 269,223. Patented Dec. 19, 1882.
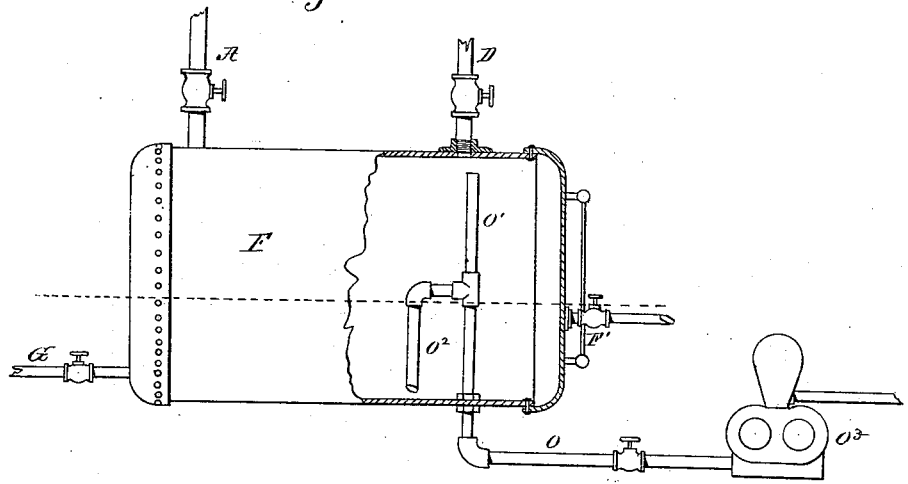
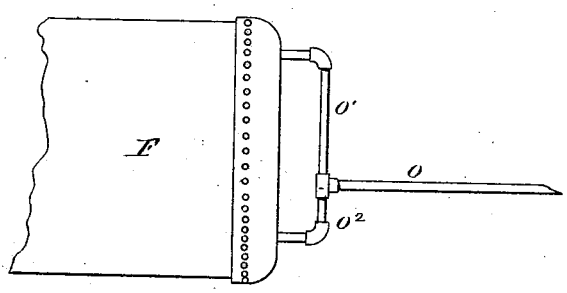
WITNESSES
INVENTOR

UNITED STATES PATENT OFFICE.

EUGENE F. OSBORNE, OF ST. PAUL, MINNESOTA.

OUTLET FOR TANKS OF STEAM HEATING APPARATUS.

SPECIFICATION forming part of Letters Patent No. 269,223, dated December 19, 1882.

Application filed April 3, 1882. (No model.)

*To all whom it may concern:*

Be it known that I, EUGENE F. OSBORNE, of St. Paul, in the county of Ramsey and State of Minnesota, have invented certain new and useful Improvements in Outlets for Tanks of Steam Heating Apparatus; and I do hereby declare that the following is a full, clear, and exact description thereof, reference being had to the accompanying drawings, and to the letters of reference marked thereon, which form a part of this specification.

This invention relates to devices for drawing off the water from reservoir seal-tanks connected with the return pipe or pipes of steam heating apparatus in which it is desired to maintain a substantially uniform level or depth of water.

The invention has for its object to provide means by which the water may be taken from beneath the surface, in order that the oil which accumulates upon the surface may not be carried back into the boiler, and also to provide such a construction in the outlet-pipes for this purpose as will prevent the water-level from being lowered below the desired point, notwithstanding said water is taken from the point near the bottom of the tank.

The invention is especially adapted to the equalized-pressure system of steam heating apparatus described in Letters Patent No. 212,320, and granted to me on 18th day of February, 1879, in which the tank is intended to insure a continuous water seal to the several return or drip pipes leading from the radiators, and from which the water of condensation is returned to the boiler by means of a pump or other form of boiler-feed.

The invention consists essentially in providing the outlet-pipe with two branches which open within the tank—one near the top of the tank and the other near the bottom—said branches being connected with the discharge-pipe at the desired water-line.

In the drawings, the tank is shown provided with such connections as are suited to the equalized-pressure system referred to.

Figure 1 shows the tank mainly in side elevation, but partly in vertical section, and provided with suitable connecting-pipes for the equalized-pressure system mentioned. The outlet pipe is also shown connected with a boiler-feed pump. Fig. 2 is a modification of the construction of the outlet-pipe shown in Fig. 1.

F is a tank of any desired dimensions and properly supported.

A represents a steam-supply pipe leading from the boiler to the tank.

D is a main pipe leading from the tank and furnishing steam therefrom to the several radiators or other working appliances of the heating apparatus.

G is the return-main leading from the several radiators to the tank, and returning the water of condensation thereto.

The pipes A and D connect with the top of the tank, and the pipe G connects therewith near the bottom. As shown in Fig. 1, the outlet-pipe O rises through the bottom of the tank to the desired water-line therein, at which point it is provided with two branches or extensions, one of which, $O'$, opens near the top of the tank and the other of which, $O^2$, opens near the bottom. By this construction the water will rise to the same level in the pipe O that it reaches in the tank, and if higher than the junction of $O^2$ with O and $O'$ the pump $O^3$, when operated, will take water until the level is lowered to said point of junction. Of course with the opening afforded by the branch $O'$ the water in the tank cannot be lowered below the said junction. Obviously any oil present will ride the surface of the water therein, and cannot therefore pass out through the pipe $O^2$.

For the purpose of occasionally drawing off the oil the pipe $F'$, having a suitable valve, is provided and situated a little below the junction of $O^2$ with the pipe O. In Fig. 2 the horizontal outlet or discharge O joins at the desired water-line with extensions $O'$ and $O^2$, which enter the tank at points respectively near the top and bottom thereof.

The same effect as that described of the construction shown in Fig. 1 is manifestly obtained by that shown in Fig. 2—to wit, by the operation of the pump or boiler-feed connected with the pipe O the water-level may be lowered to the point of junction of the branch $O'$ and $O^2$ with the discharge O, after which it will cease to act.

I claim as my invention—

1. In combination with the seal-tank of a steam heating apparatus, the outlet-pipe thereof, provided with open branches leading therefrom at the desired water-line, and terminating at their open ends one above and the other below such water-line, substantially as and for the purposes stated.

2. In combination with the seal-tank of a steam heating apparatus provided with means for drawing off the water therefrom below its surface, a valved pipe, F', located at or about the water-line for drawing off the oil which may be collected upon the surface of the water, substantially as described.

In testimony that I claim the foregoing as my invention I affix my signature in presence of two witnesses.

EUGENE F. OSBORNE.

Witnesses:
 M. E. DAYTON,
 W. C. ADAMS.